United States Patent
Oliemuller et al.

[19]

[11] Patent Number: 6,034,443
[45] Date of Patent: Mar. 7, 2000

[54] METHOD AND DEVICE FOR SUPPLYING ELECTRICAL ENERGY, AND APPARATUS PROVIDED WITH SUCH A DEVICE

[75] Inventors: Robbert J. Oliemuller, Amsterdam; Albertus Butter, Groet, both of Netherlands; Michael J.G. Bartels, Nordhorn, Germany

[73] Assignee: Bartoli N.V., Curacao, Netherlands Antilles

[21] Appl. No.: 09/015,951

[22] Filed: Jan. 30, 1998

[30] Foreign Application Priority Data

Aug. 1, 1995 [NL] Netherlands ............................ 1000915

[51] Int. Cl.[7] ........................................ H02J 7/00
[52] U.S. Cl. ................... 307/70; 307/64; 307/81; 320/135
[58] Field of Search .................... 307/43, 70, 64, 307/66, 87; 320/135, 127, 137

[56] References Cited

U.S. PATENT DOCUMENTS

| 4,297,590 | 10/1981 | Vail ........................................... 307/43 |
| 4,797,566 | 1/1989 | Nozaki et al. ............................. 307/43 |
| 5,567,993 | 10/1996 | Jones et al. ............................... 307/43 |
| 5,610,497 | 3/1997 | Croughwell ............................... 307/70 |
| 5,666,006 | 9/1997 | Townsley et al. ......................... 307/43 |

*Primary Examiner*—Albert W. Paladini
*Attorney, Agent, or Firm*—Burns, Doane, Swecker & Mathis, L.L.P.

[57] ABSTRACT

A method and device for supplying electrical energy to an electrical load using a set of chargeable and dischargeable direct current sources is provided. In a first step, all the direct current sources of the set are charged. In a second step, the first of the set of direct current sources is connected to the load in order to supply electrical energy to the latter. After a predetermined time, the connection between the first direct current source and the load is broken. The two preceding steps are repeated for each following direct current source. The three preceding steps are repeated, during which the direct current source connected to the load charges, via a charging device, at least one of the other direct current sources such that each direct current source of the set of direct current sources passes through a discharge-charge cycle.

13 Claims, 5 Drawing Sheets

METHOD AND DEVICE FOR SUPPLYING ELECTRICAL ENERGY, AND APPARATUS PROVIDED WITH SUCH A DEVICE

This application is a continuation of application Ser. No. PCT/NL96/00309, filed Jul. 31, 1996.

The present invention relates to a method and device for supplying electrical energy to an electrical load using a set of chargeable and dischargeable direct current sources.

Chargeable and dischargeable direct-current sources are generally known, for example for use in cases where the load must be able to operate independently of the public (alternating current) electricity supply (for example to supply portable equipment and tools, electric vehicles, emergency power installations). The electric load in question is in some cases fed directly with direct current, but indirect feeding, after conversion of the direct current into single-phase or multiphase alternating current, is also possible.

Before use the direct current source or sources is or are charged from the public supply, other generator installations, solar cells, wind turbines or the like. Energy can then be taken from the direct current source or sources until the latter is or are completely or partly exhausted, whereupon the use of the direct current source or sources must be interrupted in order to recharge it or them.

A difficulty with the conventional use of chargeable and dischargeable direct current sources, such as NiCd cells, batteries based on Li or the like, is the limited amount of energy which the sources can supply, starting from the fully charged state, within a given period of time, before they can no longer be used and must be recharged. The useful life of the sources—the time during which the sources can supply direct current energy—is therefore limited. In addition, the charging of the source is energy- and time-consuming and generally requires manipulations, such as the connection of the source via a charging circuit to another energy source, such as the public electricity supply. This is a roundabout procedure. Longer useful lives for apparatus supplied with direct current are in fact possible only by connecting a plurality of direct current sources in parallel or by the prompt replacement of completely or partly discharged direct current sources by another, fully charged direct current source. This is also a roundabout procedure and leads to an increase in volume, mass and cost in this use of electricity, while the increase in volume and mass is found to be very disadvantageous in particular for portable apparatus and electric vehicles.

The invention seeks to lengthen very considerably the useful life of a set of chargeable and dischargeable direct current sources, without having to increase the volume and/or mass proportionately for this purpose. As a result, practically no restrictions should now exist in respect of making the direct current sources independent of other energy sources, such as the public supply, other generator installations, solar cells, wind turbines and the like.

In the method according to the invention this object is achieved by carrying out the following steps:
(a) charging all the direct current sources of the set;
(b) connecting the first of the set of direct current sources to the load, in order to supply electrical energy to the latter, during which time the first direct current source is partly discharged;
(c) after a predetermined time, breaking the connection between the first direct current source and the load;
(d) repeating steps (b) and (c) for each following direct current source of the set of direct current sources;
(e) repeating steps (b), (c) and (d), the direct current source connected to the load charging, via a charging device, at least one of the other direct current sources, this being done such that each direct current source of the set of direct current sources passes through a discharge-charge cycle.

In order to ensure a continuous supply of energy to the electrical load, the connection between a direct current source and the load is broken only after a connection has been made between a following direct current source and the load.

The method according to the invention is preferably carried out such that for each direct current source the sum of the discharging time and the charging time is smaller than the duration of the discharge-charge cycle. The discharge-charge cycle thus includes a period of time in which the direct current source is at rest, that is to say is supplying no energy and also receiving no energy. The direct current source is thereby kept in optimum condition.

In order to enable each direct current source, after its discharge during its connection to the load, to be recharged as well as possible, the charging time for each direct current source is preferably made longer than the discharging time.

For a set of m direct current sources and a discharge-charge cycle duration of n seconds, each direct current source is preferably connected to the load for a time of at least n/m seconds. This applies in general to cases where identical direct current sources are used; if the direct current sources are different from one another, they can be connected to the load for a period of time either longer or shorter than n/m seconds.

A device for supplying electrical energy to an electrical load, comprising a set of m chargeable and dischargeable direct current sources, is characterized according to the invention by:
discharging switch means for making and breaking a connection between the first up to and including the m-th direct current sources and the load;
charging switch means for making and breaking a connection of the m direct current sources to one another, with the interposition of a charging device; and
control means for controlling the discharging switch means and the charging switch means such that in succession:
(a) the first of the set of direct current sources is connected to the load, in order to supply electrical energy to the load, during which time the first direct current source is partly discharged;
(b) after a predetermined time, the connection between the first direct current source and the load is broken;
(c) steps (a) and (b) are repeated for each following direct current source of the set of direct current sources, and
(d) steps (a), (b) and (c) are repeated, the direct current source connected to the load charging, via the charging device, at least one of the other direct current sources, this being done such that each direct current source of the set of direct current sources passes through a discharge-charge cycle.

In a preferred embodiment the direct current source consists of an accumulator, for example an NiCd accumulator. The accumulator is preferably operated in the capacity range above 100% in order to achieve the particularly long useful life of a set of direct current sources in accordance with the invention.

For a set of m direct current sources, at most m-1 of the direct current sources may consist of capacitors.

In a first preferred embodiment the charging device comprises a combination of a motor and a generator driven by the motor. In a second preferred embodiment the charging device comprises a direct current/direct current converter, which may be provided with an alternating voltage intermediate stage for supplying an alternating current (partial) load.

Apparatus which can be provided with a device according to the invention comprise for example computers, portable telecommunication equipment, watches and clocks, medical apparatus whether implantable or not, industrial and domestic appliances, such as radio and television sets, video and audio equipment, washing, drying, heating and refrigerating appliances, kitchen machines, but also for example two-wheeled or multiwheeled electric vehicles, and so on.

The invention is explained below in detail by reference to the accompanying drawings, in which:

FIG. 1a shows a circuit for supplying an electrical load with the aid of two direct current sources;

FIG. 1b schematically shows the switching sequence of the switches shown in FIG. 1a;

FIG. 2a shows a circuit for supplying an electrical load with the aid of three direct current sources;

FIG. 2b schematically shows the switching sequence of the switches shown in FIG. 2a;

FIG. 2c illustrates differently from FIG. 2b the switching sequence of the switches shown in FIG. 2a;

FIG. 2d shows an alternative to the circuit according to FIG. 2a; and

In the figures the same reference numerals relate to the same components or components having the same function.

Figure 1A:
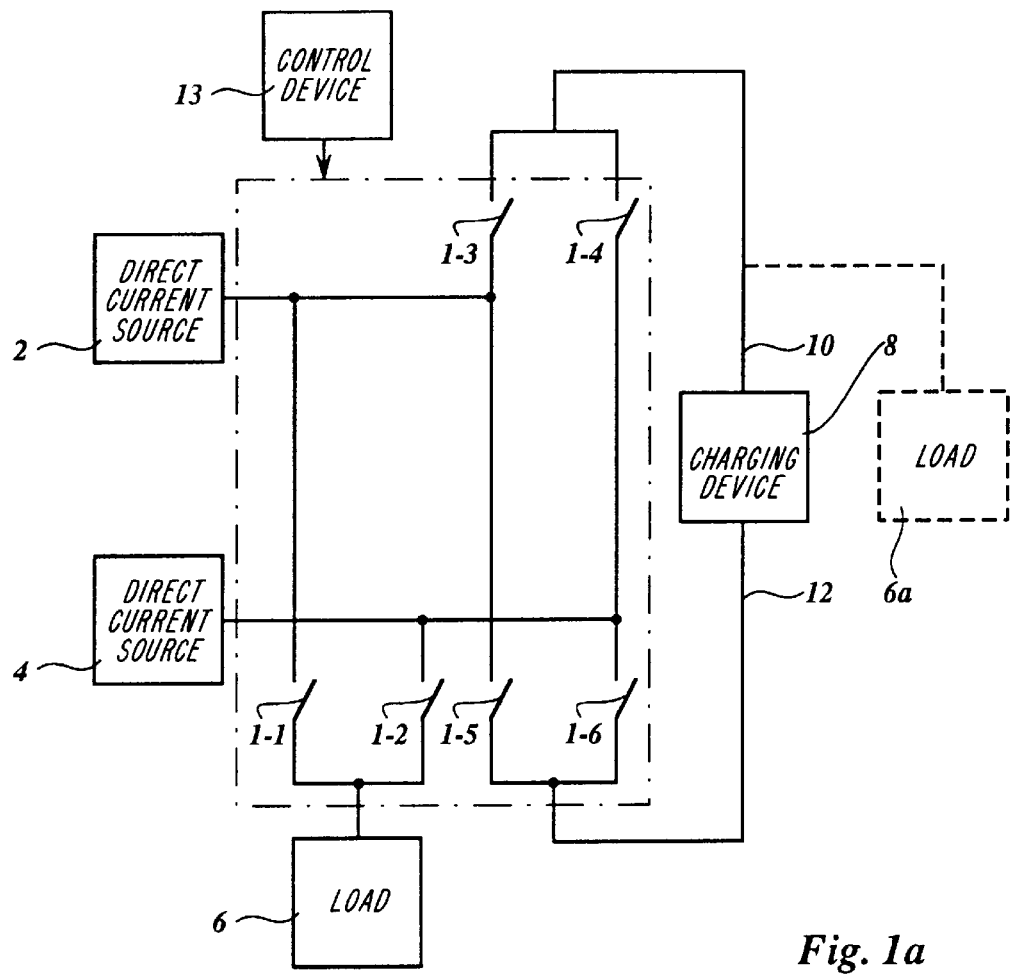

FIG. 1a shows an electric circuit in which a first direct current source 2, a second direct current source 4, an electrical load 6 and a charging device 8 are contained. For the sake of simplicity the electrical connections between the abovementioned components are shown in FIG. 1a and the following figures by means of single, continuous lines. Actually, each component obviously has a positive and a negative terminal. Thus, the diagram in FIG. 1a can be interpreted as comprising only the electrical connections between the positive terminals of the components, while the negative terminals (not shown) are connected to one another. Where connections are made between conductors crossing one another, this is indicated by a dot at the crossing point. The absence of a dot at a crossing point of conductors therefore indicates that no connection exists there. In FIG. 1a the first direct current source 2 can be connected to the load 6 by means of a switch 1-1. The second direct current source 4 can be connected to the load 6 by means of a switch 1-2. The direct current source 2 is connected to the switches 1-1, 1-3 and 1-5, which are connected to a common node. The switches 1-3 and 1-5 are also connected respectively to an input side 10 and an output side 12 of the charging device 8. The second direct current source 4 is connected to switches 1-2, 1-4 and 1-6, which are connected to a common node. The switches 1-4 and 1-6 are also connected respectively to the input side 10 and the output side 12 of the charging device 8.

Figure 1B:
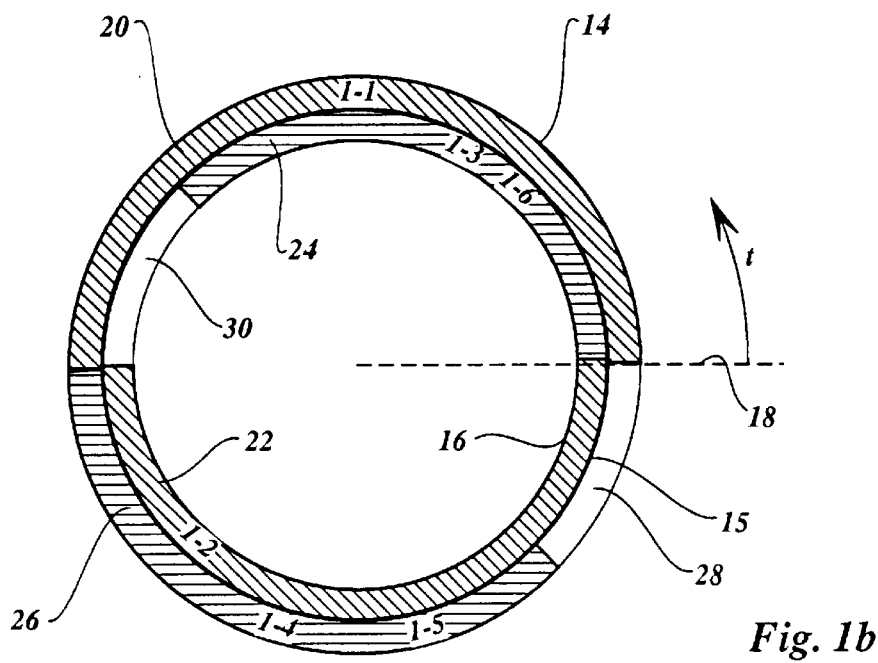

The open or closed state of the switches 1-1 to 1-6 inclusive is controlled by means of a control device 13 (not illustrated in detail) and is symbolically represented in FIG. 1b. The annular strip bounded by the circles 14 and 15 represents the operating states of the direct current source 2; the annular strip bounded by the circles 15 and 16 represents the operating states of the direct current source 4. The operating states are defined by that segment of the annular strips which at any moment of time t is intersected by a dashed time line 18 uniformly rotating around the center of the concentric circles 14–16. It will be clear that the states of the direct current sources 2 and 4 vary cyclically. A slopingly hatched segment of a strip here indicates that the direct current source in question is being discharged, that is to say is supplying energy, while a horizontally hatched segment of a strip indicates that the direct current source in question is being charged, that is to say is receiving energy. A segment which is not hatched in one of the two strips indicates that the direct current source in question is at rest, that is to say is being neither discharged nor charged. This method of hatching or not hatching will be retained in the subsequent figures.

In the length of time of segment 20 the switch 1-1 is closed, so that the load 6 is supplied by the first direct current source 2. In the length of time of segment 22 the switch 1-2 is closed, so that the load 6 is then supplied from the second direct current source 4. From FIG. 1b it is clear that the closing of the switch 1-2 precedes the opening of the switch 1-1, and that the closing of the switch 1-1 precedes the opening of the switch 1-2, so that a continuous supply of energy to the load is ensured. This, however, is not necessary for all types of loads 6; if the load 6 is for example a heating element, and if the heating-up time constant is (considerably) greater than the discharge-charge cycle time of the direct current sources, the discharge time of the direct current sources can be made shorter, so that the segments 20 and 22 no longer overlap. During the length of time of segment 24 the switches 1-3 and 1-6 are closed, so that the second direct current source 4 is charged via the charging device 8 by the first direct current source 2. Conversely, during the length of time of segment 26 the switches 1-4 and 1-5 are closed, so that the second direct current source 4 charges the first direct current source 2 via the charging device 8. In the length of time of segments 28 and 30 the first and second direct current sources 2 and 4 respectively are at rest; they supply no energy and they also receive no energy.

From FIG. 1b it can be seen that the direct current sources 2 and 4 each pass through cycles comprising in succession discharging, charging, resting, discharging, charging, resting, discharging, . . . , and so on. During a part of the time in which the first direct current source 2 supplies the load 6, the first direct current source 2 likewise charges the second direct current source 4 via the charging device 8. Conversely, the second direct current source 4 charges the first direct current source 2 via the charging device 8 during a part of the time in which the second direct current source 4 supplies the load 6. Depending on the type of direct current source, it is however not necessary for a rest period to follow during a cycle, after the discharging and charging of a direct current source.

The duration of a cycle comprising discharging, charging and optionally resting can be adapted to the type of direct current source and the nature of the load.

The segments 24 and 26 indicate that during the length of time corresponding thereto the switches 1-3 and 1-6 and the switches 1-4 and 1-5 respectively are closed. This need not mean that the charging device charges the direct current source 4 or 2 respectively, which is connected to the charging device, during the entire length of time of the segments 24 and 26; this is dependent on the charging requirements of the direct current source concerned. The length of time of the segments 24 and 26 is in each case made so long that complete charging occurs. Proceeding on this basis, the switches 1-3 and 1-6 can in principle also remain closed during the length of time of segment 30, provided that during the combined length of time of segments 24 and 30 complete charging of the direct current source 4 occurs. Similar reasoning applies to segments 26 and 28 and the direct current source 2. It is then no longer necessary to control the supply of the load 6 with the aid of separate switches 1-1 and 1-2; the switches 1-1 and 1-2 can be dispensed with in this case, and the load can also be connected in parallel to the charging device 8, for example in the manner indicated by dashed lines in the Figure for a load 6a.

The charging device can be made in the form of a generator driven by an electric motor, but may also be of static design, and is provided with a control means such that the direct current source to which the charging device 8 is connected receives precisely the amount of charge needed.

Figure 2A:
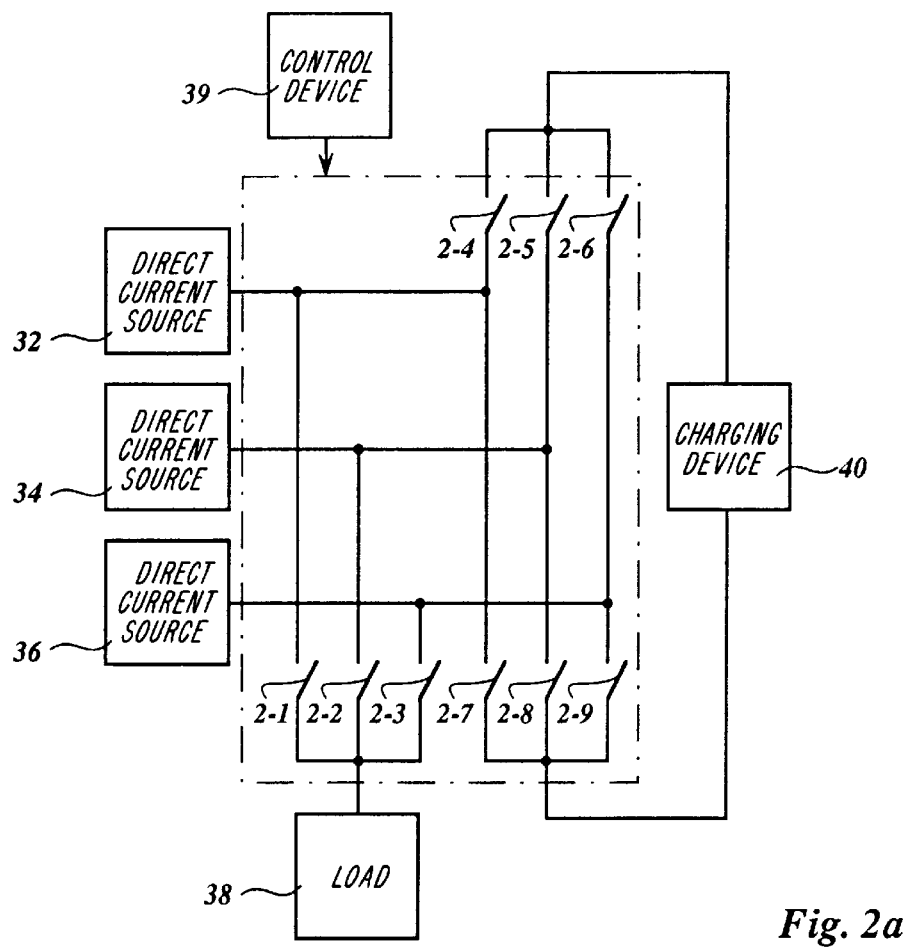

FIG. 2a shows a circuit comprising three direct current sources 32, 34 and 36, which can supply an electrical load 38 and in which each direct current source 32, 34 or 36 can simultaneously charge one or two other direct current sources via a charging device 40. The load 38 can be connected, under the control of a control device 39, by means of parallel switches 2-1, 2-2 and 2-3 to a respective direct current source 32, 34 and 36, while the charging of the direct current sources 32, 34 and 36 is attended to by a circuit comprising switches 2-4, 2-5, 2-6, 2-7, 2-8, and 2-9.

Figure 2B:
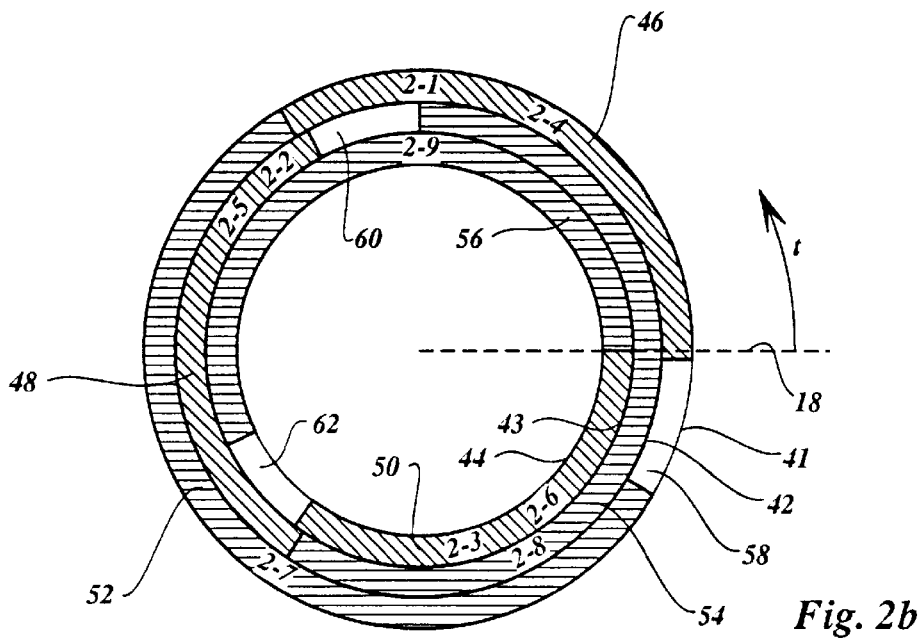

FIG. 2b shows, between the circles 41 and 42, a strip which relates to the operating states of direct current source 32, between the circles 42 and 43 a strip which relates to the operating states of direct current source 34, and between the circles 43 and 44 a strip which relates to the operating states of the direct current source 36. The diagram according to FIG. 2b should be interpreted in the same way as the diagram according to FIG. 1b. In the length of time defined by the segment 46 the switch 2-1 is closed, so that the direct current source 32 supplies the load 38. During the length of time of the segment 48 the supplying of the load 38 is taken over by the direct current source 34, the switch 2-2 being closed. The supplying of the load 38 is then taken over by the direct current source 36 during the length of time of the segment 50, the switch 2-3 being closed. The segments 46, 48 and 50 overlap one another, so that an uninterrupted supply to the load 38 is ensured. The discharging of the direct current source 32 in the length of time of the segment 46 is followed by a charging of the direct current source 32 in the length of time of segment 52, during which time the switch 2-7 is closed. From FIG. 2b it can be seen that a part of the charging is provided by the direct current source 34 via the closed switch 2-5, and a following part is provided by the direct current source 36 via the closed switch 2-6. In corresponding manner the charging of the direct current source 34 during a part of the length of time required for that purpose in accordance with the segment 54 is provided by the direct current source 36 via the closed switch 2-6, and during a following part of that length of time is provided by the direct current source 32 via the closed switch 2-4. The charging of the direct current source 36 takes place during the length of time of the segment 56, during which the switch 2-9 is closed, the direct current source 32 charging first via the closed switch 2-4, and the direct current source 34 then charging via the closed switch 2-5. In order to protect the direct current sources 32, 34 and 36, each discharging and charging period can be followed by a rest period, which is indicated by the segments 58, 60 and 62 respectively.

The switches 1-1 to 1-6 inclusive in FIG. 1a and the switches 2-1 to 2-9 inclusive in FIG. 2a may be in the form of mechanical switches or of semiconductor switches, such as thyristors or transistors, depending on the frequency and accuracy of the switching and the power to be switched. The control device 13 in FIG. 1a and the control device 39 in FIG. 2a are adapted to the type of switch to be controlled; in the case of mechanical switches use may for example be made of a rotating operating roller which is provided with cams for operating the switches, and in the case of electronic switches use may be made of a logic control circuit, such as a Programmable Logic Controller (PLC), for controlling the switches.

Figure 2C:
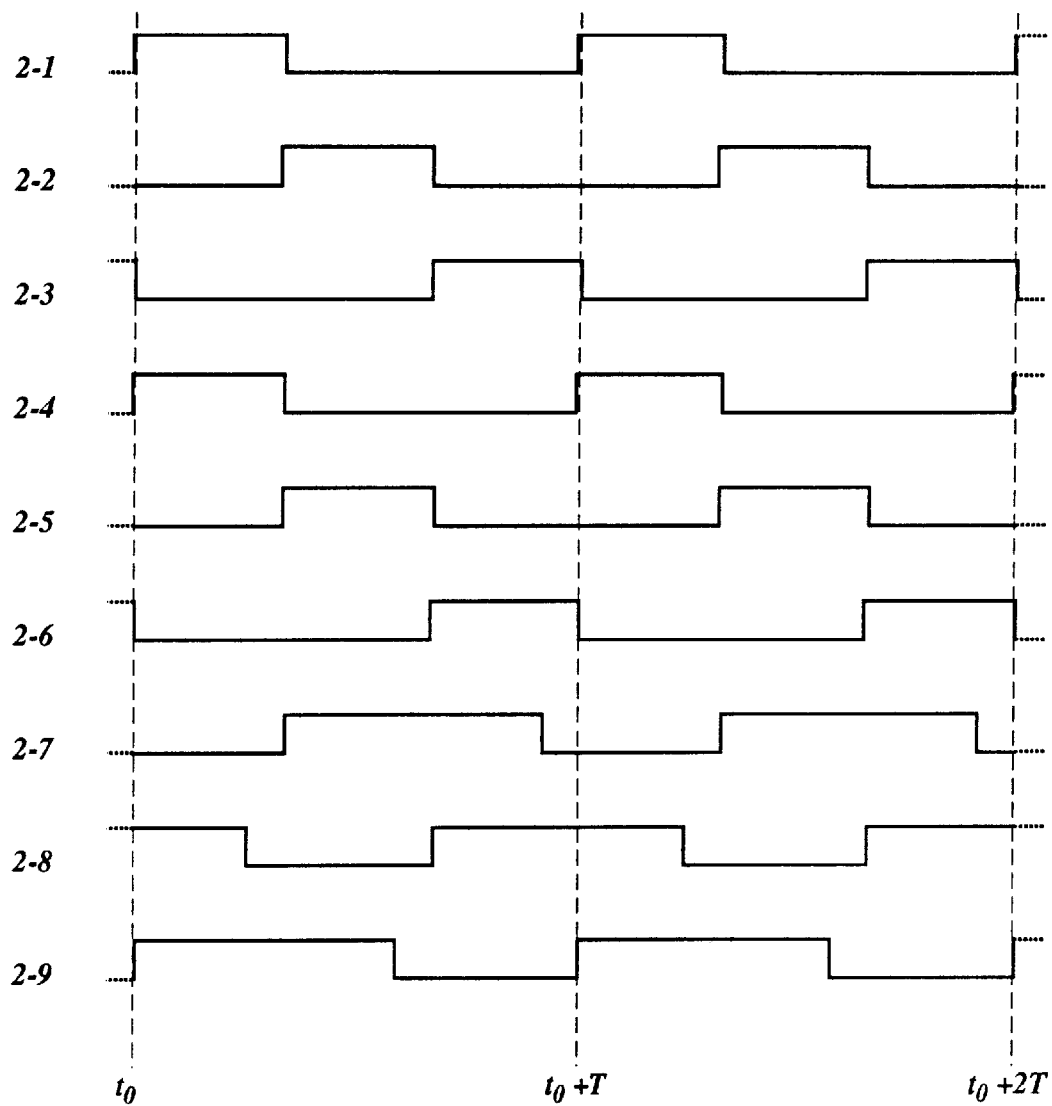

In order to avoid any misunderstanding regarding the interpretation of FIG. 2b in relation to FIG. 2a, the sequence and duration of the switching of the switches 2-1 to 2-9 inclusive shown in FIG. 2a are represented in an alternative manner in FIG. 2c. The switching cycles of the respective switches 2-1 to 2-9 inclusive are shown from top to bottom in FIG. 2c, a high level representing the closed state of a switch and a low level the open state of a switch. In the horizontal direction two complete cycles, each with a time duration T, are set out, the starting moment of time $t_0$ and the moments of time $t_0+T$ and $t_0+2T$ corresponding to the position of the dashed time line 18 shown in FIG. 2b.

Figure 2D:
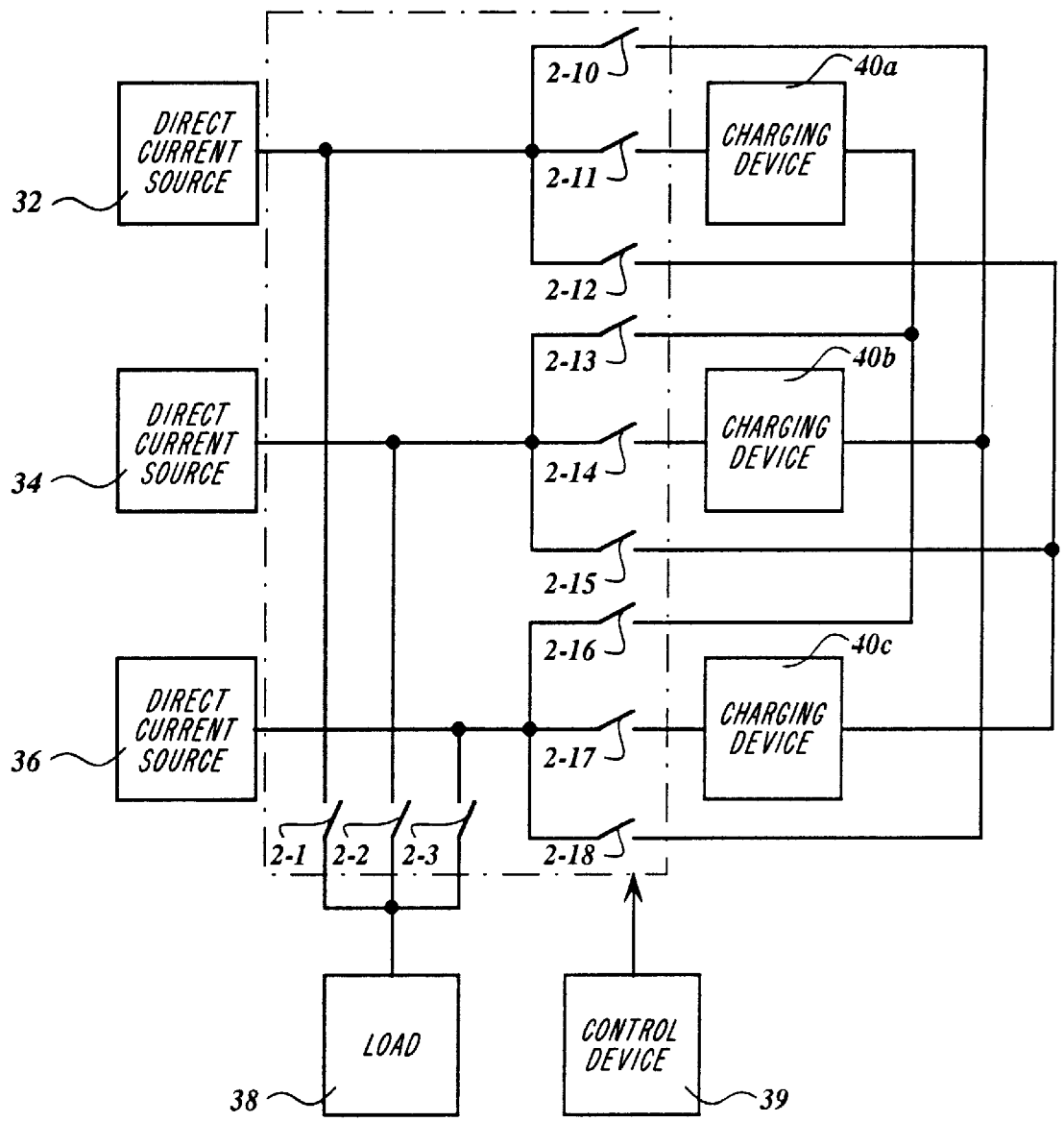

The circuit according to FIG. 2d differs mainly from that shown in FIG. 2a only in the use of individual charging devices 40a, 40b and 40c for the respective direct current sources 32, 34 and 36 instead of the common charging device 40 in the circuit according to FIG. 2a. Through the use of the individual charging devices 40a, 40b and 40c, for the charging of the direct current sources 32, 34 and 36 nine switches 2-10 to 2-18 inclusive should be provided. The direct current source 32 will therefore be able, through the closing of the switches 2-11 and 2-13, to charge the direct current source 34 via the charging device 40a, and through the closing of the switches 2-11 and 2-16 to charge the direct current source 36 via the charging device 40a. For the charging of the direct current source 32 by the direct current source 34 with the aid of the charging device 40b, the switches 2-14 and 2-10 are closed, while for the charging of the direct current source 36 by the direct current source 34 the switches 2-14 and 2-18 are closed. In order to charge the direct current source 32 with the aid of the direct current source 36, via the charging device 40c, the switches 2-17 and 2-12 must be closed, and for the charging of the direct current source 34 by the direct current source 36 the switches 2-17 and 2-15 are closed. Thus, for the entire circuit represented in FIG. 2d, exactly the same action can be achieved as that already explained above with reference to FIGS. 2a and 2b.

A maximum of one of the direct current sources 2 and 4 in FIG. 1a and a maximum of two of the direct current sources 32, 34 and 36 in FIG. 2a or 2d may consist of a capacitor, while a minimum of one of the direct current sources mentioned must be an accumulator.

Figure 3:
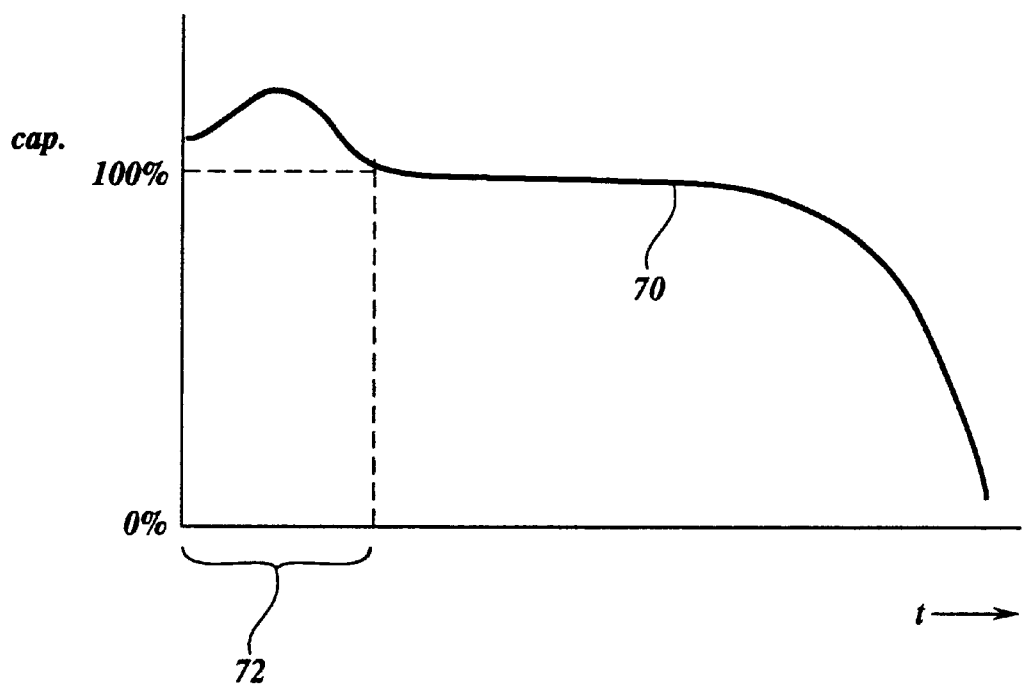
FIG. 3 shows a charging/discharging curve of a direct current source.

FIG. 3 shows a discharging/charging curve 70 of a chargeable and dischargeable direct current source in the form of an accumulator, the capacity or voltage of the direct current source being shown on the vertical axis, and the duration (time t) of the discharging being shown on the horizontal axis. In the case of charging, the time axis should be reversed. The amount of the discharge of each of the direct current sources is determined by the power absorbed by the load and by the time during which the discharging continues. During the operation of the circuits according to the invention it should be ensured that the discharging and charging of the direct current sources take place in the region marked 72, in the capacity range above 100%, in the vicinity of the peak of the discharging/charging curve 70. It has been found that this region is never shown in discharging curves for commercially available direct current sources, but in fact does exist and plays an important role in the present invention.

On the basis of the principles which can easily be derived from FIGS. 1a, 1b, 2a, 2b and 2d, it will also be possible to construct circuits having more than three direct current sources.

In an experiment three hundred NiCd cells were assembled to form a 24 V, 60 Ah accumulator. Three accumulators of this kind were connected in the manner shown in FIG. 2a and operated in accordance with FIG. 2b, with a load in the form of lamps of a power of 143 W and a discharge-charge cycle time of a few seconds. After being continuously in operation for more than a week, no decline of the capacity of the accumulators could be detected.

We claim:

1. A method for supplying electrical energy to an electrical load using a set of chargeable and dischargeable direct current sources, the method comprising the following steps:
    (a) charging all the direct current sources of the set;
    (b) connecting a first of the set of direct current sources to the load, in order to supply electrical energy to the load, during which time the first of the set of direct current sources is partly discharged;
    (c) after a predetermined time, breaking the connection between the first of the set of direct current sources and the load;
    (d) repeating steps (b) and (c) for each following direct current source of the set of direct current sources;
    (e) repeating steps (b), (c) and (d), the direct current source connected to the load charging, via a charging device, at least one of the other direct current sources, this being done such that each direct current source of the set of direct current sources passes through a discharge-charge cycle.

2. The method of claim 1, wherein the connection between a direct current source and the load is broken only after a connection has been made between a following direct current source and the load.

3. The method of claim 1, wherein for each direct current source the sum of the discharging time and the charging time per discharge-charge cycle is smaller than the duration of the discharge-charge cycle.

4. The method of claim 1, wherein for each direct current source the charging time is longer than the discharging time.

5. The method of claim 1, wherein for a set of m direct current sources and a discharge-charge cycle duration of n seconds, each direct current source is connected to the load for a time of at least n/m seconds.

6. A device for supplying electrical energy to an electrical load, the device comprising:
    a set of m chargeable and dischargeable direct current sources;
    discharging switch means for making and breaking a connection between the first up to and including the m-th direct current sources and the load;
    charging switch means for making and breaking a connection of at least one of the m direct current sources to at least one other one of the m direct current sources with the interposition of a charging device; and
    control means for controlling the discharging switch means and the charging switch means such that in succession:
        (a) the first of the set of direct current sources is connected to the load, in order to supply electrical energy to the latter, during which time the first direct current source is partly discharged;
        (b) after a predetermined time the connection between the first direct current source and the load is broken;
        (c) steps (a) and (b) are repeated for each following direct current source of the set of direct current sources; and
        (d) steps (a), (b) and (c) are repeated, the direct current source connected to the load charging, via the charging device, at least one of the other direct current sources, this being done such that each direct current source of the set of direct current sources passes through a discharge-charge cycle.

7. The device of claim 6, wherein the direct current source is an accumulator.

8. The device of claim 7, wherein the accumulator is an NiCd accumulator.

9. The device of claim 7, wherein the control means are arranged for discharging and charging the accumulator in the capacity range above 100%.

10. The device of claim 6, wherein the direct current source is a capacitor, at most m-1 capacitors being used.

11. The device of claim 6, wherein the charging device comprises a combination of a motor and a generator driven by the motor.

12. The device of claim 6, wherein the charging device comprises a direct current/direct current converter.

13. The device of claim 12, wherein the direct current/direct current converter has an alternating voltage intermediate stage.

* * * * *